Oct. 19, 1926.

R. HOPKINSON 1,603,465

METHOD OF MAKING AN INFLATABLE VULCANIZED ARTICLE

Filed June 5, 1923  2 Sheets-Sheet 1

Inventor
RUSSELL HOPKINSON
By his Attorney

Oct. 19, 1926. 1,603,465
R. HOPKINSON
METHOD OF MAKING AN INFLATABLE VULCANIZED ARTICLE
Filed June 5, 1923 2 Sheets-Sheet 2

Inventor
RUSSELL HOPKINSON
By his Attorney

Patented Oct. 19, 1926.

1,603,465

UNITED STATES PATENT OFFICE.

RUSSELL HOPKINSON, OF ELMHURST, NEW YORK, ASSIGNOR TO THE GOODYEAR'S INDIA RUBBER GLOVE MFG. COMPANY, OF NAUGATUCK, CONNECTICUT, A CORPORATION OF CONNECTICUT.

METHOD OF MAKING AN INFLATABLE VULCANIZED ARTICLE.

Application filed June 5, 1923. Serial No. 643,563.

This invention relates to a method of making an inflatable vulcanized article, more particularly as applied to the making of a pneumatic surf board.

The use of surf boards by bathers at the various beaches is becoming quite common. In using such boards the bather walks out into the water as far as possible and upon the approach of a breaker launches himself upon the board and in the direction of the shore just as the crest of the breaker reaches him, the object being to maintain the board in such a position that it tends to slide by gravity down the forward face of the wave, but due to the inward movement of the wave the board is carried forward continually until the shore is reached. As commonly constructed these boards are made of wood or other rigid material and their use is therefore attended with some risk, owing to the likelihood of the user and those in the vicinity being struck by the board. Moreover, as the boards are somewhat bulky they are inconvenient to carry when not in use. It has been proposed to make a pneumatic surf board in which the outer casing is divided into compartments and elongated inflatable bags inserted into the compartments, secured in place and then individually inflated. Such boards are relatively heavy, expensive, and considerable time is required to assemble them.

An object is to provide a simple and economic method for making inflatable rubber articles.

A further object is to provide a method for making pneumatic surf boards and similar articles in the flat without the use of forms.

Figure 1:
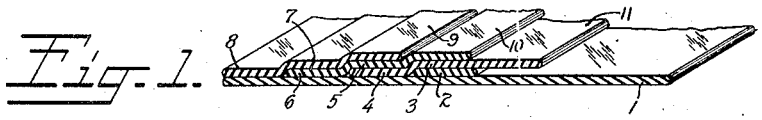
Figure 2:
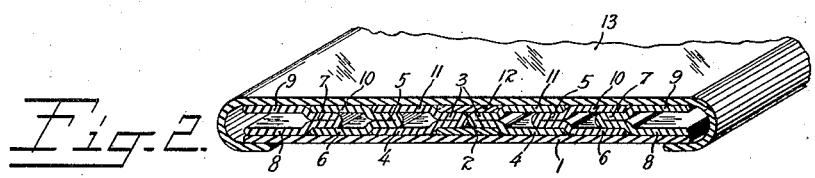
Figure 3:
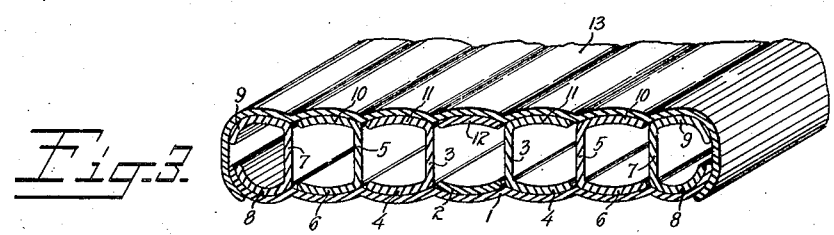
Figure 4:
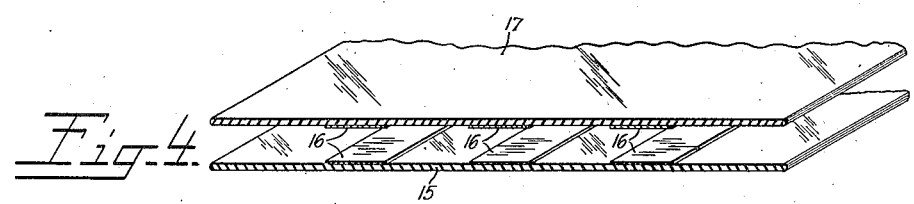
Figure 5:
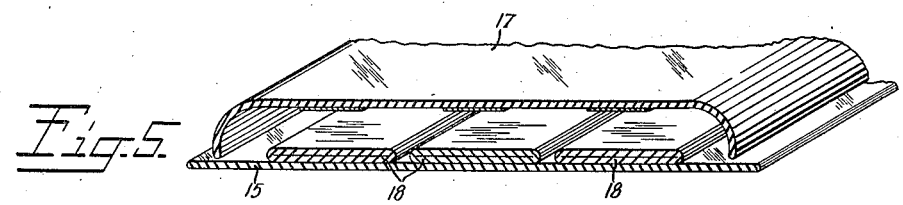
Figure 6:
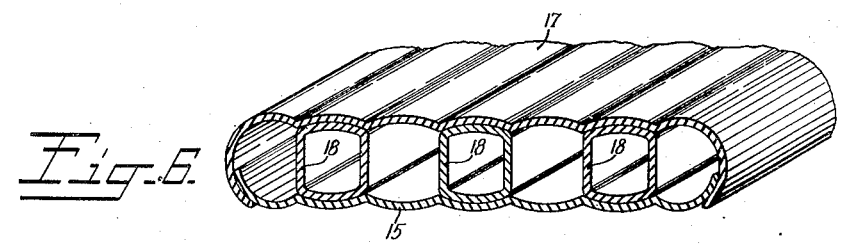
Figure 12:
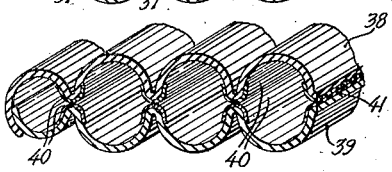
Figure 13:
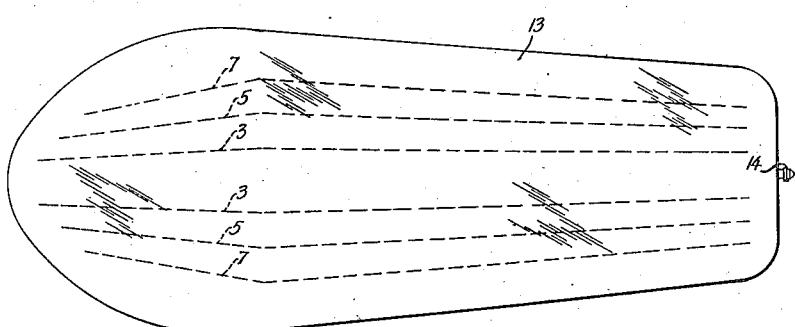
Figure 14:
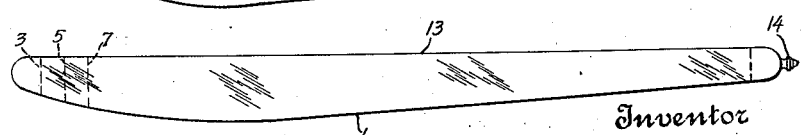
Figure 15:
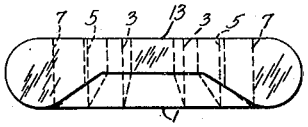

For a detailed disclosure of the invention reference is had to the accompanying specification and drawings, in which latter:

Fig. 1 represents in sectional perspective a partially completed pneumatic article made according to one form of the method, Fig. 2 is a similar view of the article in more or less diagrammatic form at a later stage in the carrying out of the method, Fig. 3 is a similar view of the finished inflated article, Fig. 4 is a diagrammatic view illustrating a step in the carrying out of another modification of the method, Fig. 5 illustrates a later stage of said modification, Fig. 6 represents a finished article made by the method as shown in Figs. 4 and 5, Figs. 7 and 8 are fragmentary illustrations of the article in two stages of its manufacture by another form of the method, Figs. 9, 10, 11, and 12 each illustrate articles made by further modifications of the method, Fig. 13 is a plan view of a finished surf board, Fig. 14 is a side elevation thereof, and Fig. 15 is a front view.

Referring to Figs. 1–3, when carrying out the method in the manner shown therein, a bottom sheet 1 of any suitable unvulcanized rubberized fabric is laid in the flat, which sheet may be cemented on its upper face along its central portion and from thence to its left hand edge. A spacing strip of rubberized fabric 2 is then laid on the central cemented portion and rolled down. Another strip 3 of rubberized fabric of greater width is then superposed on the strip 2 with its edges projecting at each side of the latter, and the projecting portion 4 which overlies the cemented portion of the sheet 1 is rolled down into union with the latter. A strip 5 similar to the strip 3 is laid on the strip 3 in a shingled arrangement and that portion 6 of it which overhangs the cemented portion of the sheet 1 is rolled into contact with the latter. A strip 7 similar to the strips 3 and 5 is next placed in position in the same manner and its overhanging portion 8 rolled down into connection with the sheet 1. If the sheet 1 is of greater width this process will of course be continued until the edge of the sheet is reached. The strips 2, 3, 5, and 7 may be of fabric frictioned on its lower side only, in which case the frictioned portions of the strips will not adhere to the uncoated fabric surfaces which they overlie. However, it may be desirable to friction both sides of the strips and in this case all portions of the strips which are not to be adhesively united may be dusted with starch or talc. The right hand side of the sheet 1 may then be cemented and a series of strips joined thereto in the same manner but with the overlap oppositely directed. Those portions of the strips which are to be united to the sheet 1 may of course also be cemented. Each strip is then exactly doubled upon itself as shown diagrammatically in Fig. 2 and at the center a spacing strip 12 is laid on exactly above the spacing strip 2. A top sheet 13 which may have its under surface cemented is then united to the portions 9, 10 and 11 of the doubled over strips which overlie the respective portions 8, 6, and 4, and it is also united to the top spacing strip 12. By reason of the extended area of connection between the strips 3, 5, and 7, and the top and bottom said strips are vary strongly connected to the top and bottom. The top sheet 13 and bottom sheet 1 are then joined all around their edges in any suitable manner as by overlapping, and a valve inserted at a suitable place, which in the case of a pneumatic surf board may be inserted at the rear as shown at 14 in Fig. 13. The article may then be very lightly inflated to the form shown in Fig. 3 and cured. As the usual heat of vulcanization renders the stock so soft that it tends to run or become quite plastic it is preferable to use a stock containing one of the so-called "cold cure accelerators." When using such a stock the article may be left to cure at ordinary temperatures, or if it is desired to hasten the process it may be heated for a short time at a relatively low temperature, for instance 150° F. While in the present form of the invention the parts have been described as being cemented together it is obvious that the green rubber parts may be merely adhesively united by rolling and the final cure relied on to permanently unite them in the manner commonly depended upon in making plied up rubber articles. Moreover, if desired, the article may be built up of vulcanized stock with the use of an ordinary or a self curing cement to secure the parts.

In the case of some articles such as mattresses, cushions, etc., it may be desired to make them of the same thickness throughout, but in the case of the surf board it is preferred to have the greatest depth at a point between ¼ and ⅓ the length from the bow, and decrease the depth from this point to the bow and stern. To accomplish this purpose the strips 2, 3, 5, and 7 can be made of a width regularly decreasing, or the strips may be made of a uniform width and the portion of the strip which is cemented to the top or bottom made of increasing width from the point of greatest depth, or the two methods may be combined.

In a modified form of the method as illustrated in Figs. 4 to 6 the bottom and top sheets 15 and 17, respectively, are coated with cement to form adhesive spaced strips 16 correspondingly disposed on the upper and lower sheets. Tubes 18 which may be formed of rubberized fabric are flattened so as to form superposed plies, and the flattened tubes laid centrally on the cemented strips 16 of the bottom sheet and rolled down. The top sheet 17 is then disposed so that its cemented strips 16 are located centrally of the top plies of the flattened tubes, the sheet rolled down and the edges of the sheets joined by lapping or otherwise to completely inclose the article, which when inflated has the form shown in Fig. 6. In this modification when it is desired to make the article of greater depth at any point the tubes 18 may be made tapering or conical with the greatest diameter at the point where the greatest depth is desired, or instead the cemented area which joins each tube to the sheet may be made of a gradually increasing width from the point of greatest depth.

Figure 7:
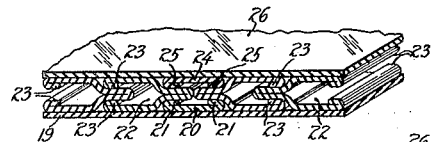
Figure 8:
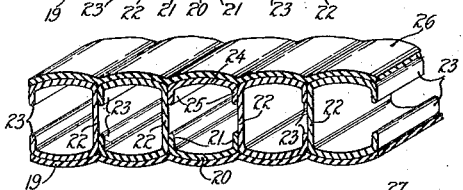

In Figs. 7 and 8 there is shown a further modification of the method which is very similar to that shown in Figs. 1-3. In this form the bottom sheet 19 is laid flat as before and the spacing strip 20 is cemented to the bottom sheet as in the form shown in Fig. 1. However, the spacing strip is made of a greater width and its edges are folded over as shown at 21. The strips 22 are disposed on the bottom in shingled arrangement as in the form shown in Fig. 1, but the strips are of somewhat greater width and at the edges are folded in as shown at 23. When the strips are doubled over the folded top edge 23 is disposed directly over the lower one. The central top spacing strip 24 is of a width corresponding to the bottom strip 20 and has its edges turned under as shown at 25. The top sheet 26 is then cemented and rolled down in exactly the same manner as in the form shown in Figs. 1-3. It will be seen from an inspection of Fig. 8 that in the finished article the strips 22 form strengthening and stiffening ribs exactly as do the strips 3, 5, and 7, but that in addition the portions of the ribs which are connected to the top and bottom also extend downwardly and upwardly, respectively, on the vertical portions of the adjoining ribs, thereby both further strengthening the connection between the ribs and the top and bottom and also making the ribs stiffer. The extended ends of the central spacing strips 20 and 24 perform a similar function for the ribs adjoining them. In addition, in both the form shown in Figs. 1-3 and that shown in Figs. 7 and 8, the top and bottom are in effect made two ply by reason of the spacing strips and attaching ends of the connecting strips, thereby greatly strengthening the article.

Figure 9:
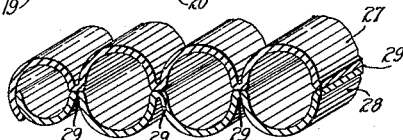

A simplified form of the invention is shown in Fig. 9, in which the top and bottom sheets 27 and 28 are united along narrow spaced areas 29 by rolling them into adhesion or by both cementing and rolling them so that in the finished and cured article the top and bottom will be firmly united at these points. When inflated it assumes the shape as illustrated in the figure.

Figure 10:
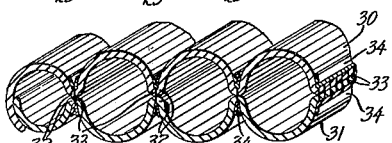

The form shown in Fig. 10 is similar to that in Fig. 9 and the top and bottom sheets 30 and 31, respectively, are united along narrow spaced areas 32 in the same manner as in the form shown in Fig. 9, but strengthening members such as the stitches 33 are disposed in the joined areas, and the stitches covered by gum strips 34. It is obvious that instead of the stitches, staples or any other suitable fastenings may be employed.

Figure 11:
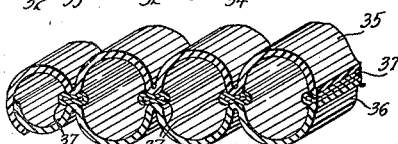

In the form shown in Fig. 11 the top sheet 35 and bottom sheet 36 are united along narrow spaced areas by means of the interposed small tubes 37 of rubberized fabric. These tubes are flattened out when the parts are rolled together and the superposed plies furnish a relatively extended uniting area to the top and bottom sheets.

In the form shown in Fig. 12 the top sheet 38 and bottom sheet 39 are also united along narrow spaced areas by interposed strengthening and stiffening members. Each stiffening member is formed of two superposed strips 40 of rubberized fabric which may be rolled into adhesive contact on their center line and also stitched or otherwise secured along this line as shown at 41, while the remainder of the contacting faces of the strips 40 are kept from adhering by the use of starch or talc. In making an article according to this modification of the method the bottom sheet is laid flat and a series of the strengthening members disposed on the bottom sheet in spaced relation, the bottom face of the lower strip 40 being cemented. The strengthening members are then rolled down on the bottom sheet, the upper face of the top strengthening member cemented, and the top sheet rolled down. The edges of the top and bottom sheets are then joined as before and the article cured. This modification also provides an extended joining area between the strengthening member and the top and bottom sheets. It is obvious as before stated that either or both of a pair of surfaces to be joined may be cemented or the natural adhesion may be relied upon while building up the parts.

It will be seen that by my invention a pneumatic surf board is provided which in the finished article is a unitary body, and which can be simply and economically built up in the flat from the prepared parts. By merely increasing the air pressure a surf board of any desired stiffness may be obtained, but if desired stiffening members may be inserted in the vertical ribs or in the top and bottom. By deflating the article it can be rolled into small compass for shipping or storage. When inflated the vertical ribs 3, 5, and 7 as shown in Figs. 1 to 3, or the various connections shown in the modified forms, act as strengthening and connecting members and also to stiffen the board.

While the invention has been particularly shown and described as applied to a pneumatic surf board it is obvious that it is not so limited in its application and that it can be used for making pneumatic floats of various kinds, mattresses, cushions, and many other articles, and it is therefore not desired to limit the invention otherwise than as set forth in the appended claims.

Having thus described my invention, what I claim and desire to protect by Letters Patent is:

1. The method of making inflatable articles in the flat which comprises joining a top and bottom of rubber containing material in the flat by interposed strengthening elements disposed along spaced lines, and uniting all free edges of the top and bottom.

2. The method of making inflatable rubber articles which comprises superposing top and bottom sheets of rubber containing material, uniting them in the flat by the aid of strengthening and connecting elements along a series of spaced lines, and uniting their edges at all points to form an inflatable body.

3. The method of making inflatable rubber articles which comprises superposing top and bottom sheets of rubber containing material, adhesively uniting them in the flat by interposed strengthening and connecting elements disposed along spaced lines, and uniting the sheet edges at all points to form an inflatable body.

4. The method of making inflatable rubber articles which comprises disposing in the flat a bottom sheet of rubber containing material, disposing a plurality of strengthening and connecting elements thereon and adhesively uniting a portion of each element to the sheet, superposing and uniting a top sheet in the flat to another portion of each element in a similar manner, and uniting the edges of the sheets at all points to form an inflatable body.

5. The method of making inflatable rubber articles which comprises disposing in the flat a bottom sheet of rubber containing material, disposing a plurality of strengthening and connecting elements in two ply relation on said sheet and adhesively uniting the lower ply of each element to the bottom sheet, superposing a top sheet and adhesively uniting it in the flat to the upper ply of each element, and uniting the edges of the sheets at all points to form an inflatable body.

6. The method of making inflatable rubber articles which comprises disposing in the flat a bottom sheet of unvulcanized rubber containing material, disposing a plurality of strengthening and connecting elements in two ply relation on said sheet and adhesively uniting the lower ply of each element to the bottom sheet, similarly uniting the upper ply of each element to a top sheet in the flat, adhesively uniting the edges of the sheets at all points, and curing by the aid of a non-halogen cold cure accelerator.

7. The method of making inflatable articles in the flat which comprises disposing a bottom of rubber containing material in the flat, uniting thereto in the flat one edge portion of each of a plurality of spaced dividing and connecting elements, uniting a top in the flat to other edge portions of said elements, and joining the free edges of said bottom and top.

8. The method of making inflatable rubber articles which comprises disposing in the flat a bottom sheet of rubber containing material, adhesively uniting thereto one edge portion of each of a plurality of strengthening and connecting strips, said strips being arranged in two series with their free edge portions oppositely directed, folding down said free edge portions over the united edge portions, adhesively uniting the upper surfaces of the free edge portions to a top sheet, and uniting the edges of the sheets at all points.

9. The method of making inflatable rubber articles which comprises disposing in the flat a bottom sheet of rubber containing material, disposing thereon series of strengthening and connecting strips in oppositely directed and shingled arrangement, adhesively uniting to the sheet a portion of each strip in direct contact therewith, doubling each strip on itself, superposing a top sheet and adhesively uniting it to each strip at points directly above said first mentioned portions, and uniting the edges of the sheets at all points.

10. The method of making inflatable articles in the flat which comprises disposing a bottom of rubber containing material in the flat, adhesively uniting thereto a central spacing strip, disposing on said strip a connecting strip having an edge portion directly overlying said bottom at one side of the spacing strip, adhesively uniting said overlying edge portion to the bottom, successively and similarly uniting a plurality of other connecting strips to said bottom, uniting a series of connecting strips to said bottom in similar manner on the opposite side of the spacing strip, folding over the free edge portion of each connecting strip on its adhesively united edge portion, disposing a second spacing strip above said first one, adhesively uniting a top to said free edge portions and second spacing strip in manner similar to the bottom, and uniting the top and bottom at their free edges to form an inflatable body.

Signed at New York city, county of New York, and State of New York, this 1st day of June, 1923.

RUSSELL HOPKINSON.